UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

ELECTRIC BATTERY.

1,331,877.   Specification of Letters Patent.   Patented Feb. 24, 1920.

No Drawing.   Application filed July 5, 1918. Serial No. 243,463.

*To all whom it may concern:*

Be it known that I, OTTO E. RUHOFF, a citizen of the United States, residing at Madison, in the county of Dane and State of Wisconsin, have invented a certain new and useful Improvement in Electric Batteries, of which the following is a specification.

This invention relates to electric batteries, and more particularly dry cells and batteries of the type used in electric flash-lamps carried in the hand.

The object of the invention is to place in the battery either in or around the depolarizing material (which is, as is well understood in the art, placed between the carbon and the zinc,) a chemical which acts to deposit another chemical product on the surface of the zinc which retards or prevents chemical action of the depolarizing material upon the zinc when the battery is at rest but does not interfere with the action of the battery when it is put in use or service.

The invention consists in means for accomplishing the foregoing object, which can be easily and cheaply adopted and used, and which is satisfactory in use. More particularly, the invention consists in the use of potassium bichromate or other salt of chromic acid for the purpose named and the special features which will be hereafter set forth in the specification and claims.

In the use of the invention in its preferred form as applied to a dry cell, which ordinarily consists essentially of a carbon pencil, a body of more or less tamped powdered depolarizing material surrounding the carbon, and a sheet of zinc wrapped around the depolarizing material; a partition of paper or pulp board is inserted between the depolarizing material and the zinc, and said paper lining is saturated previous to assembling of the battery, with a moderate percentage of potassium bichromate or other salt of chromic acid. The strength of the solution used for this saturating purpose contains usually from 1 to 5 per cent. of a salt of chromic acid.

When a battery of this construction has been built, the particular salt used acts upon the zinc sufficiently to form a thin layer of zinc chromate, or basic zinc chromate, as the case may be, ordinarily yellow in color, which is of such a character as to prevent almost complete chemical action upon the zinc by the chemicals in the depolarizing material when the battery is at rest, but does not interfere with the action of the battery when it is put in service.

The same result is obtained by omitting the paper portion, and using the bag type of battery construction, and mixing the chemical in question with the depolarizing material itself, or with the electrolyte. The same result may be obtained by painting the zinc with the suitable salt of chromic acid and allowing the zinc chromate to form before the battery is put together.

By the use of the invention, a cell may be kept three or more years on a store shelf without serious deterioration, which is some two years more than batteries heretofore constructed can be kept.

Having thus described my invention what I claim as new, and desire to secure by Letters Patent, is:

1. In a dry battery, in combination with the usual carbon, powdered depolarizing material and zinc, a porous partition inserted between the depolarizing material and zinc soaked, in the process of manufacture, with a solution of potassium bichromate or other salt of chromic acid adapted to act on the zinc to form a product which protects the zinc from the depolarizing material when the battery is at rest, but does not affect the efficiency of the battery when in action.

2. In a dry battery, in combination with the usual carbon, powdered depolarizing material and zinc, a porous partition inserted between the depolarizing material and zinc soaked, in the process of manufacture, with a 1 to 5 per cent. solution of potassium bichromate or other salt of chromic acid adapted to act on the zinc to form a product which protects the zinc from the depolarizing material when the battery is at rest, but does not effect the efficiency of the battery when in action.

In witness whereof, I have hereunto subscribed my name in the presence of two witnesses.

OTTO E. RUHOFF.

Witnesses:
 A. O. OLMAN,
 F. W. EIGHMY.